United States Patent
Yang et al.

(10) Patent No.: US 9,632,501 B1
(45) Date of Patent: Apr. 25, 2017

(54) METHOD AND APPARATUS FOR CONTROLLING UAV, AND UAV TAKE-OFF SYSTEM

(71) Applicant: ZEROTECH (Shenzhen) Intelligence Robot Co., Ltd, Shenzhen (CN)

(72) Inventors: Jianjun Yang, Beijing (CN); Lin Yang, Beijing (CN)

(73) Assignee: ZEROTECH (Shenzhen) Intelligence Robot Co., Ltd, Longgang District, Shenzhen (CN)

( * ) Notice: Subject to any disclaimer, the term of this patent is extended or adjusted under 35 U.S.C. 154(b) by 0 days.

(21) Appl. No.: 15/180,027

(22) Filed: Jun. 12, 2016

(30) Foreign Application Priority Data

Apr. 11, 2016 (CN) .......................... 2016 1 0221731

(51) Int. Cl.
| | |
|---|---|
| *G05D 1/00* | (2006.01) |
| *B64C 39/02* | (2006.01) |
| *G05D 1/06* | (2006.01) |
| *B64F 1/00* | (2006.01) |
| *B64C 19/00* | (2006.01) |
| *G06F 3/01* | (2006.01) |

(52) U.S. Cl.
CPC ............ *G05D 1/0011* (2013.01); *B64C 19/00* (2013.01); *B64C 39/024* (2013.01); *B64F 1/007* (2013.01); *G05D 1/0661* (2013.01); *G06F 3/017* (2013.01); *B64C 2201/088* (2013.01); *B64C 2201/108* (2013.01); *B64C 2201/123* (2013.01); *B64C 2201/146* (2013.01)

(58) Field of Classification Search
CPC ....... G05D 1/0011; G05D 1/0858; B64F 1/04; B64C 39/024; B64B 1/06; A63H 27/12; G06Q 30/0601; B60K 28/04
USPC .................... 701/2, 4; 244/25, 63, 165, 180; 381/71.12
See application file for complete search history.

(56) References Cited

U.S. PATENT DOCUMENTS

| | | | | | |
|---|---|---|---|---|---|
| 5,156,232 | A | * | 10/1992 | Muroya ................. | B60K 28/04 180/273 |
| 5,730,394 | A | * | 3/1998 | Cotton ................. | G05D 1/0858 244/180 |
| 6,142,414 | A | * | 11/2000 | Doolittle .................. | B64B 1/06 244/2 |
| 2009/0076931 | A1 | * | 3/2009 | Hung ................. | G06Q 30/0601 705/26.1 |
| 2013/0206915 | A1 | * | 8/2013 | Desaulniers .......... | B64C 39/024 244/165 |
| 2013/0325217 | A1 | * | 12/2013 | Seydoux ................ | A63H 27/12 701/4 |
| 2016/0009412 | A1 | * | 1/2016 | Manasseh ................. | B64F 1/04 244/63 |
| 2016/0063987 | A1 | * | 3/2016 | Xu ........................ | B64C 39/024 381/71.12 |

* cited by examiner

*Primary Examiner* — Yuri Kan
(74) *Attorney, Agent, or Firm* — Jun He Law Offices P.C.; James J. Zhu

(57) ABSTRACT

A method for controlling an unmanned aerial vehicle (UAV) is provided. The UAV comprises at least one rotor. The method includes receiving a take-off preparatory signal; controlling a rotation speed of the at least one rotor with an idle speed rotation in response to the take-off preparatory signal; increasing the rotation speed of the at least one rotor up to a rated speed rotation under predetermined conditions.

24 Claims, 7 Drawing Sheets

METHOD AND APPARATUS FOR CONTROLLING UAV, AND UAV TAKE-OFF SYSTEM

CROSS-REFERENCE TO RELATED APPLICATIONS

This application claims priority to Chinese patent application no. 201610221731.8, the disclosure of which is incorporated herein by reference.

TECHNICAL FIELD

The present disclosure generally relates to a technique for controlling unmanned aerial vehicles (UAVs).

BACKGROUND

With the continuous development of aviation technology, aerial apparatuses have been widely used in military and civilian fields, aerial apparatus refers to an aircraft or UAVs and other aerial devices with flight capabilities and so on. Aerial apparatus has been widely used in geological disaster monitoring, forest fire prevention, aerial mapping, environmental monitoring and detection of target and other fields.

A variety of techniques have been developed in connection with the operation of the UAVs, including take-off, in-flight, and landing. For example, take-off is one of common used operations of the UAVs. In the art known to the present inventors, UAVs take-off techniques can be categorized into two approaches.

One approach is to launch the UAVs from the ground. For example, prior to take-off, a typical rotary wing UAV is placed on the ground by a professional user. Then, the professional user controls take-off of the rotary wing UAV by manipulating a remote control device associated with the rotary wing UAV. During take-off, in order to make the UAVs' take-off safe and normal, the professional user is required to control the UAVs' attitude balance and propulsion power output.

An alternative approach is to launch the UAVs via hand tossing. That is, UAVs are thrown into the air and then the UAVs in the air intelligently identifies take-off opportunity and starts flying in the air into the normal state. Compared with the first approach, hand launching lowers the requirement of the user's operating capability.

SUMMARY

An example method for controlling an unmanned aerial vehicle (UAV) is provided. The UAV comprises at least one rotor, and the method comprises receiving a take-off preparatory signal; controlling a rotation speed of the at least one rotor with an idle speed rotation in response to the take-off preparatory signal; increasing the rotation speed of the at least one rotor to a rated speed rotation under predetermined conditions.

An example apparatus for controlling an UAV is provided. The UAV comprises at least one rotor, and the apparatus comprises a receiver configured to receive a take-off preparatory signal; controller configured to control a rotation speed of the at least one rotor with an idle speed rotation based on the take-off preparatory signal; an increasing module configured to increase the rotation speed of the at least one rotor up to a rated speed rotation under predetermined conditions.

An example take-off system is provided. The system comprises an UAV and a take-off deck configured to permit the UAV to take off. The UAV is configured to adjust its vertical velocity such that the UAV can hover in a predetermined position upon the removal of the take-off deck.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE FIGURES

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1A:
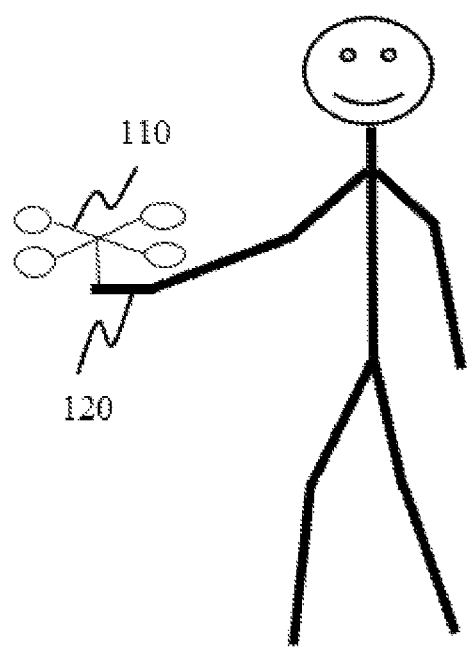
FIGS. 1A-1C are diagrams of an exemplary UAV take-off system environment within which embodiments of the disclosure may be practiced.
Figure 1B:
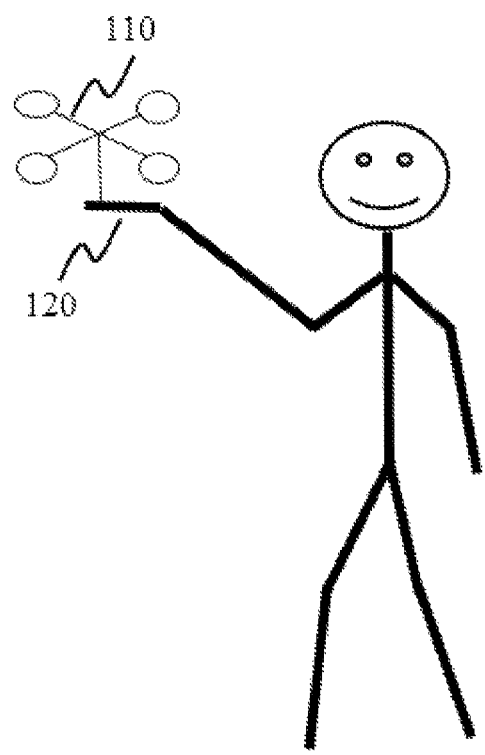
Figure 1C:
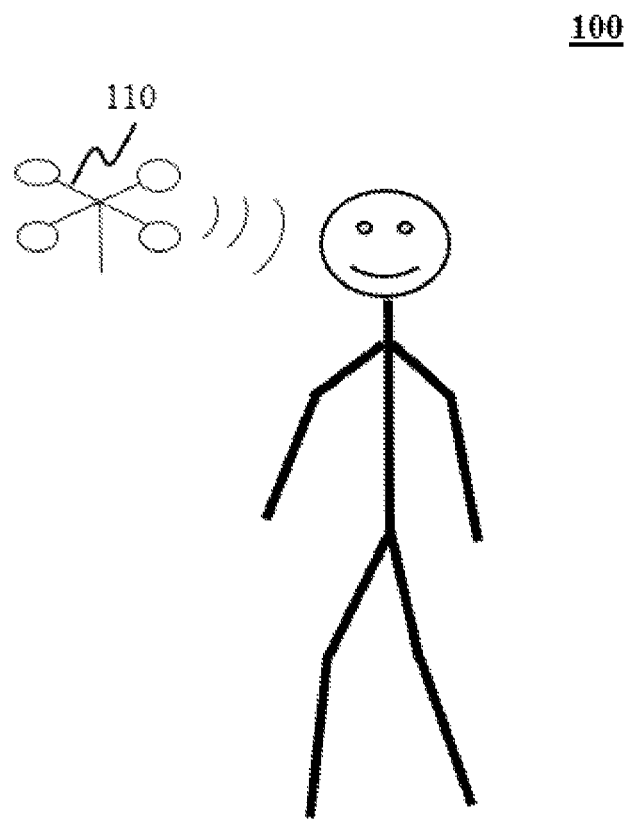

FIGS. 1A-1C illustrate an exemplary UAV take-off system environment 100 within which embodiments of the present disclosure may be practiced. In FIG. 1A, an UAV 110 and a take-off platform 120 are provided in the UAV take-off system environment 100. The UAV 110 represents an aircraft without a human pilot aboard. The flight of UAV 110 may be controlled with various kinds of autonomy. It may be operated either by a given degree of remote control from a user, located on the ground or in another vehicle, or fully autonomously, by onboard computers. Further, in order to fully operate and extend its capability, the UAV 110 may be programmed with various computer software and carry payloads such as cameras, power supply, sensors, actuators. For example, the UAV 110 can be configured with an image capturing component, such as a camera, to capture an image during a flight in civilian or military use. In the example of capturing the image in civilian use, the UAV can be configured to flight in a particular height to capture an image of the user.

Further, UAVs can be categorized into a rotary-wing UAV and a fixed-wing UAV. Typically, the rotary-wing UAV does not require runways to take off or land from and possesses the capacity to hover over areas while performing agile maneuvering. In the example of FIG. 1A, the UAV 110 is equipped with a plurality of rotors, for example, four rotors. However, persons of ordinary skill in the art will recognize that the UAV 110 may carry on any number of rotors as required without departing from the spirit or scope of the present disclosure. That is, the UAV 110 drives its body through adjusting the propulsion output of the rotors, thereby moving the UAV 110 as required in a desired direction and at a desired speed.

The take-off platform 120 refers to a tool that supports the UAV 110 before take-off. As depicted in FIG. 1A, the take-off platform 120 refers to the user's hand. More specifically, the UAV 110 may be put on a palm of the user's hand and prepared to launch from the palm. However, the UAV 110 may be assisted and supported by other tools, such as a mobile platform with a certain height.

As shown in FIG. 1A, the UAV 110 is placed by a user on the take-off platform 120 and prepared to launch from the user's hand 120 according to the user's instructions. In FIG. 1A, the UAV 110 is placed at a position, for example, a first preset position with a relative low height (below the user's head.) However, persons of ordinary skill in the art will recognize that the UAV 110 may be placed at other positions without departing from the spirit or scope of the present disclosure. The user could input an instruction to the UAV 110 at the position shown in FIG. 1A. Once the instruction is input by the user, the UAV 110 could control its propulsion units to start outputting a relative low power. For example, the UAV 110 could control a rotation speed of at least one rotor with an idle speed rotation in response to the instruction.

Additionally, once the instruction is input by the user, a first timer could be set up to start counting a first preset delay time to remind the user that the UAV 110 is about to control its propulsion units to output power. Then, based on predetermined conditions, the UAV 110 will adjust the output of power to achieve intended operations, for example, hover at the first preset position. Specifically, the UAV 110 will increase the rotation speed of the at least one rotor to, for example, a rated speed rotation once the predetermined conditions are met. Here, the rated speed rotation refers to a speed that enables the UAV 110 to make stable hovering. In the example of lifting up the UAV 110 with the user's hand, once the rotation speed of the rotors is increased up to the rated speed, the UAV 110 could hover in a position as needed. Alternatively, when performing the UAV 110 take-off through other auxiliary devices, once the rotation speed of the rotors reaches the rated speed rotation, the auxiliary device is removed, the UAV 100 achieves a steady hover. An example of the predetermined conditions is that a detected vertical velocity of the UAV 110 is greater than or equal to a threshold. Another example of the predetermined conditions is a second preset delay time has lapsed since controlling a rotation speed of the at least one rotor with an idle speed rotation in response to the take-off preparatory signal. In the example of FIG. 1A, the user could withdraw his hand from holding/supporting the UAV, or move the UAV upward or downward with his hand to trigger the predetermined conditions.

As illustrated above, once the user inputs the instruction to the UAV 110, the first timer is set up to start counting a first preset delay time to remind the user that the UAV 110 is about to control its propulsion units to output power. During the first preset delay time, the user could perform additional actions. In the example of FIG. 1B, the UAV 110 is placed at a second preset position with a higher height as compared to the position of FIG. 1A, for example, substantially same as or a bit higher than the user's head. The specific height is not set as a limitation. For example, the user could move up his hand 120 holding the UAV to an intended position for his personal use, e.g., photo/video capturing. Accordingly, the UAV 110 is lifted by the user up to the intended position higher than the position as shown in FIG. 1A. Once the first preset delay time lapsed, the UAV 110 control its propulsion units to start outputting power.

Then the user could perform actions to trigger the predetermined conditions under which the UAV 110 could adjust its output power to achieve intended operations. For example, the user can withdraw his hand 120 from holding the UAV at a particular moment. In the example of FIG. 1C, once the predetermined condition is met, the UAV 110 is flying at a position with substantially same height as that of the position in FIG. 1B. That is, when the UAV 110 adjust the propulsion output of the rotors to achieve intended operations, including but not limited to, hovering at a particular height.

Figure 3:
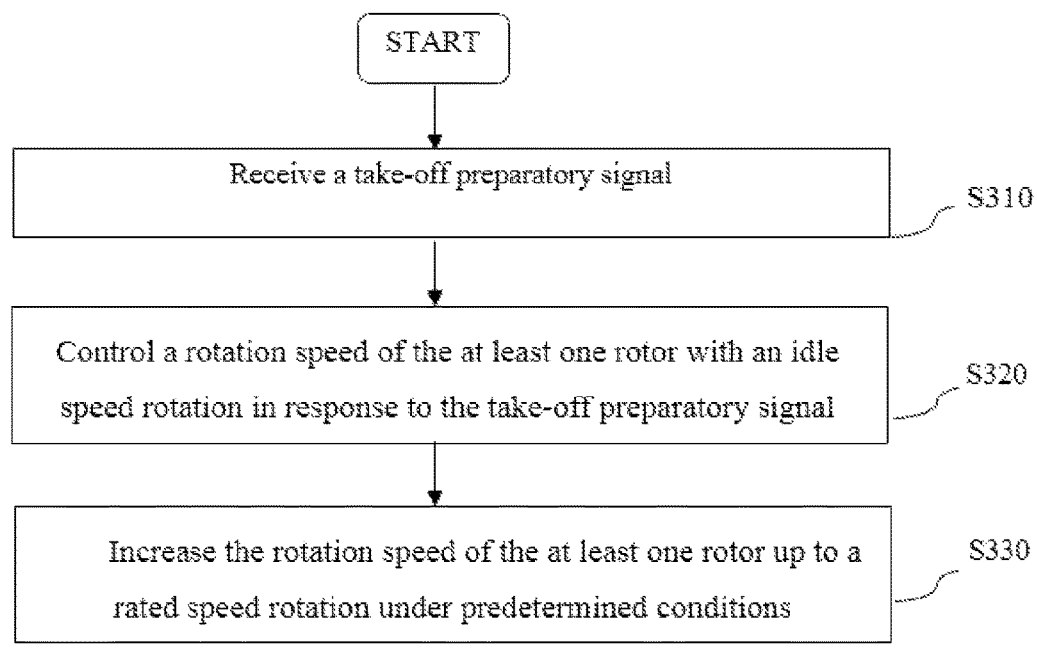
FIG. 3 is a flowchart of an exemplary method for controlling the UAV in the take-off system environment of FIGS. 1A-1C.
Figure 4:
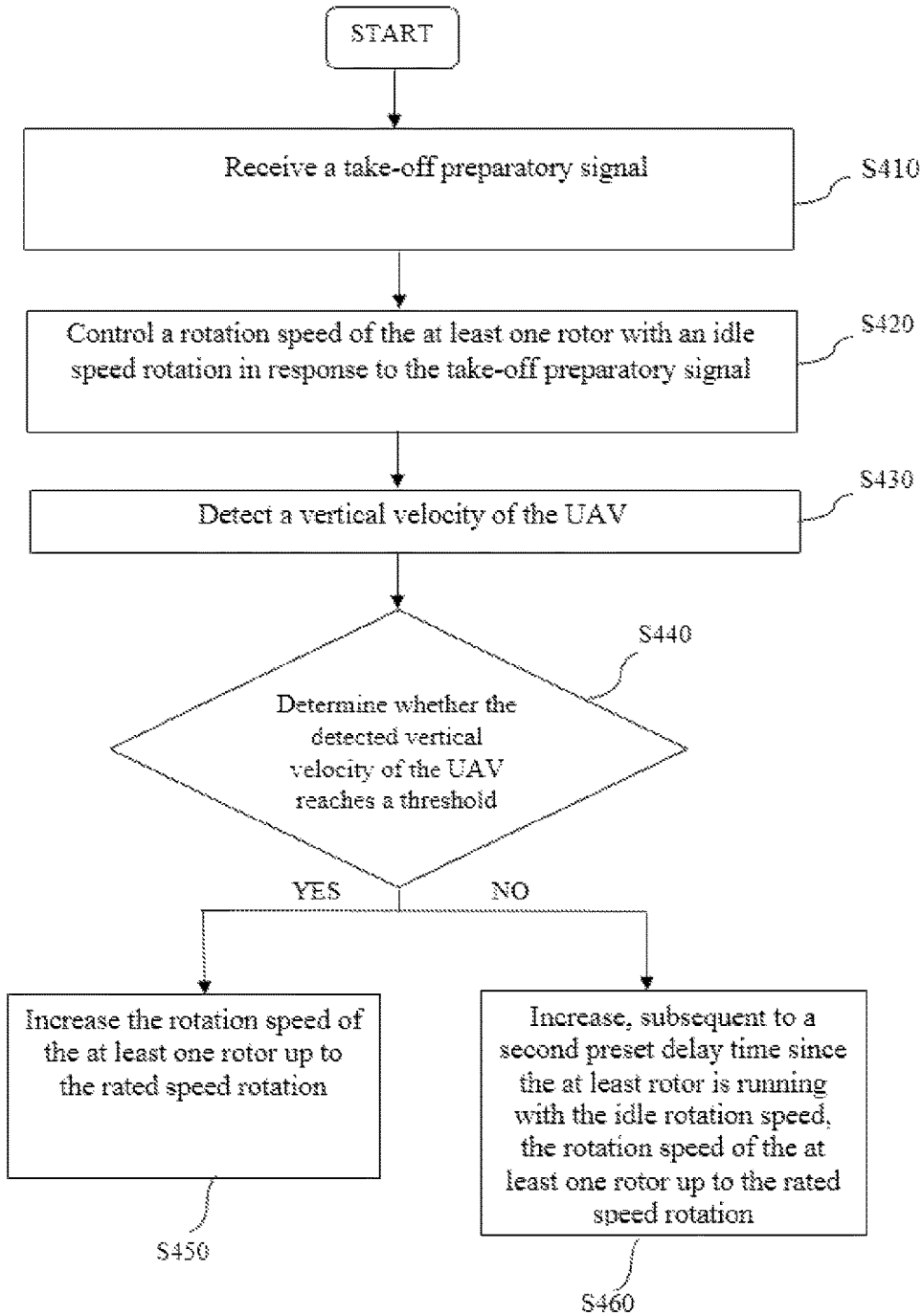
FIG. 4 is a flowchart of another exemplary method for controlling the UAV in the take-off system environment of FIGS. 1A-1C.
Figure 5:
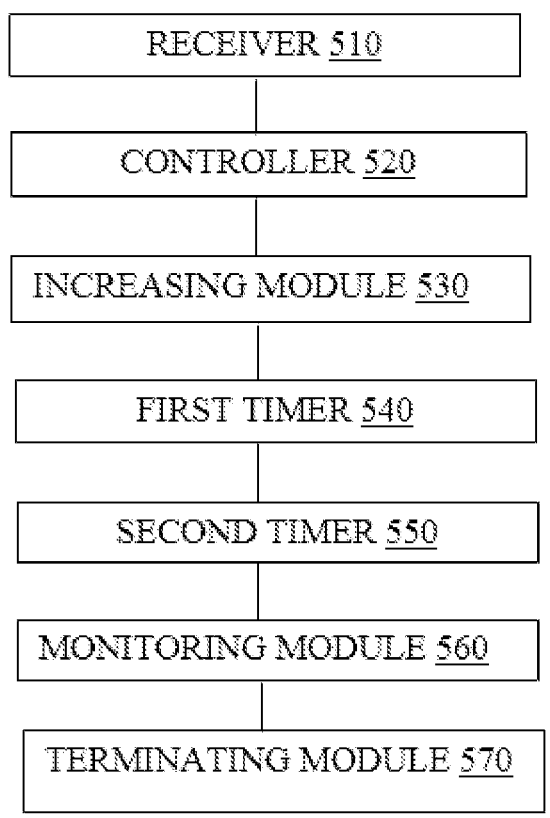
FIG. 5 is a block diagram of an exemplary control device in the UAV, as shown in FIG. 2.

Once the UAV 110 is hovering, it means that the UAV 110 has entered a normal flight state. Then, the UAV 110 could fly to any positions, for example, the same position as in FIG. 1B, to perform any operations as intended by the user. For example, the UAV 110 can be equipped with a camera to capture an image. Specifically, during the capturing, since a capturing position and a capturing angle are the key factor to get a good image, the UAV 110 can hover at an intended position and perform steady flight from the intended position, thus obtaining the capturing position and shooting angle as required by the user. Then, in accordance with the capturing angle, the user can do a variety of activities including posing to get an ideal image. Further specifics of the UAV 110 self-adjustments will be detailed in embodiments as illustrated in FIGS. 3-5.

Figure 2:
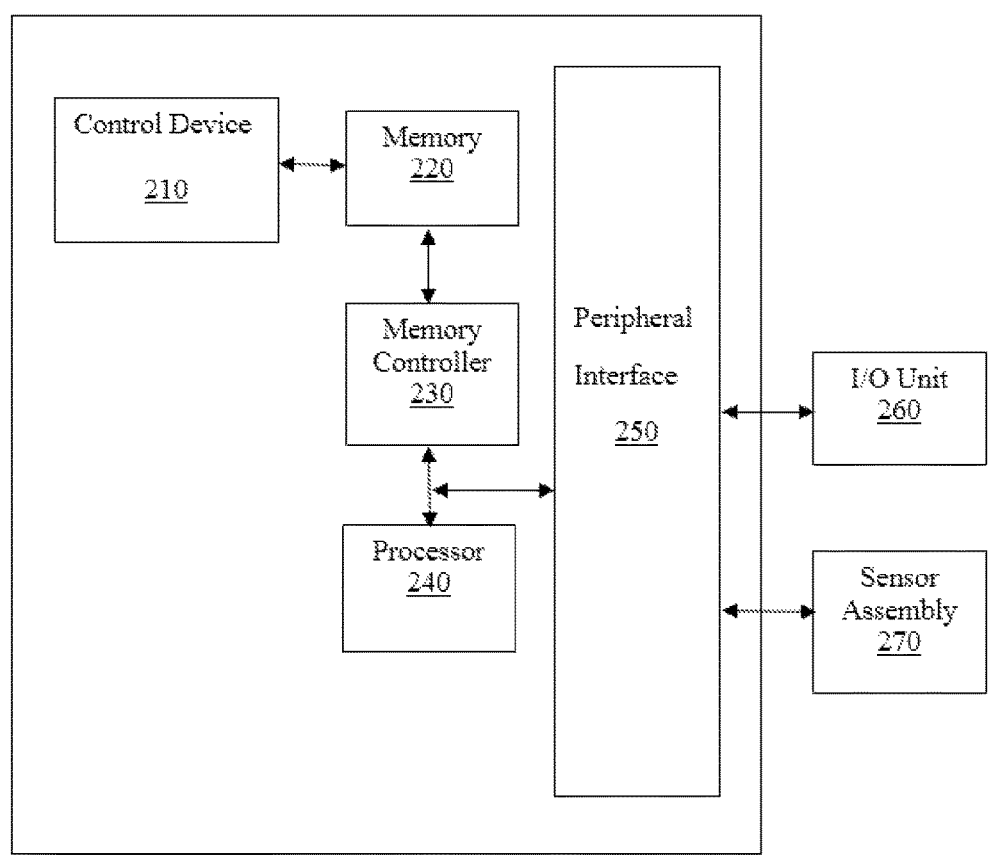
FIG. 2 is a block diagram of the UAV in the take-off system environment of FIGS. 1A-1C.

FIG. 2 is a block diagram schematically illustrating the UAV 110 in the system environment 100 of FIGS. 1A-1C.

As depicted in FIG. 2, the UAV 110 includes a control device 210, a memory 220, a memory controller 230, a processor 240, peripheral interface 250, an input and output (I/O) unit 260 and a sensor assembly 270. The memory 220, the memory controller 230, the processor 240 and the peripheral interface 250, the I/O unit 260 and the sensor assembly 270 are directly or indirectly connected to each other to achieve data transmission or exchange. For example, these elements may be electrically connected to each other via one or more communication buses or signal lines. The control device 210 can include at least one software function module in a form of software or firmware stored in the memory 220. The processor 240 is used for performing executable modules stored in the memory 220, such as software modules or computer programs included in the control device 210.

The memory 220 may be, but not limited to, random access memory (RAM), read only memory (ROM), programmable read-only memory (PROM), erasable read only memory (EPROM), electrically erasable read only memory (EEPROM) and the like. The memory 220 is used for storing program, and the processor 240 executes the program after receiving the execution instruction. The method executable by a server or a computer defined in any embodiment of the present disclosure can be applied in the processor 240, or implemented by the processor 240.

The processor 240 may be an integrated circuit chip with the signal processing capability. The processor 240 as described may be a general purpose processor, including a central processor (CPU), a network processor (NP). The processor 240 can also be a digital signal processor (DSP), application specific integrated circuit (ASIC), Field-programmable gate array (FPGA) or other programmable logic device, discrete gate or transistor logic, discrete hardware components. The processor 240 can execute or implement methods, steps and logic diagrams disclosed in embodiments of the present disclosure. The processor 240 may be a microprocessor or any conventional processor, etc.

The peripheral interface 250 gets various I/O devices coupled to the processor 240 and the memory 220. In some embodiments, the peripherals interface 250, the processor 240 and the memory controller 230 may be implemented in a single chip. In other embodiments, they may be implemented by separate chips.

The I/O unit 260 is used for users to input data to achieve interactions with the UAV 110. The I/O unit 260 may be, but not limited to, buttons, to output a corresponding signal in response to users' operation.

The sensor assembly 270 is used to output a corresponding signal in response to a user operation. In some embodiments, the sensor assembly 270 may be, but not limited to, a voice control sensor and an acceleration sensor, a gyro sensor, a barometer and the like.

FIG. 3 is a flowchart of an exemplary method for controlling the UAV 110 of FIGS. 1A-1C, according to embodiments of the disclosure.

In Step S310, a take-off preparatory signal is received by the UAV 110. The take-off preparatory signal is triggered by inputting the take-off preparatory instruction by a user. For example, the UAV 110 can be placed in a first preset position, for example, in the user's hand as depicted in FIG. 1A. Other positions are also possible. Then, the user input the instruction to the UAV 110.

The UAV 110 can be placed in the first preset position in many manners. In the example of FIG. 1A, the UAV 110 is lifted by the user's hand. In other words, the UAV 110, without propulsion from rotors, is placed on the first preset position through the user. As illustrated above, the UAV 110 may be placed on the first preset position through other devices, such as the mobile platform with a certain height. That is, any other manners that could achieve the above results are within the scope and spirit of the present disclosure.

The take-off preparatory instruction refers to an instruction from the user that instructs the UAV 110 to be prepared for subsequent actions. For example, when a corresponding sensor or button of the UAV 110 receives the take-off preparatory instruction sent from the user, the take-off preparatory instruction is converted to the takeoff preparatory signal. Then, the takeoff preparatory signal is transmitted to a processor 240 of the UAV 110.

The take-off preparatory instruction may be input by a variety of manners, for example, by pressing a button of the UAV 110, voice control or tapping the UAV 110, etc. Accordingly, the take-off preparatory signal is input to the processor 240 of the UAV 110 through a button, a voice control sensor or an acceleration sensor. Specifically, the take-off preparatory instruction may be transmitted to the processor 240 in a form of a signal when the user triggers the button.

As to using the voice control to input the take-off preparatory instruction, the user could input a specified voice control instruction, for example, "take-off preparation." Then, the UAV 110 receives the voice control instruction through the voice control sensor and takes the voice control instruction as the take-off preparatory instruction, and converts the take-off preparatory instruction to the take-off preparatory signal. Then, the take-off preparatory instruction is transmitted to the processor 240.

As to tapping the UAV 110 to input the take-off preparatory instruction, the UAV 110 detects, through the acceleration sensor, an amplitude signal produced by the tapping. More specifically, in a predetermined time period, the UAV 110 continuously detects a preset number of the amplitude signals that is greater than a preset strength, and thus identifies it as the take-off preparatory instruction. No limitations are set to the predetermined time period. For example, the predetermined time period can be any value between 1 to 5 seconds. Alternatively, the predetermined time period may be any value other than between 1 to 5 seconds. Additionally, when the acceleration sensor detects the amplitude signal, a low-pass filtering process is performed to the amplitude signal: filtering out part of the high-frequency noise. Then, a determination is made if the amplitude signal after the filtering noise is greater than a preset strength. In the present embodiment, no limitations are set to a cut-off frequency of the low-pass filtering. For example, the cut-off frequency could be 40 Hz, or may be other value. Also, the preset strength of the amplitude signal may be set depending on the circumstances. For example, it may be an amplitude corresponding to an acceleration greater than 2.5 g, and g is the gravitational acceleration.

In some embodiments, prior to placing the UAV 110 on the first preset position, the take-off preparatory instruction could be input/transmitted to the UAV 110 at a position different from the first preset position. Upon receiving the take-off preparatory instruction, the UAV 110 does not perform subsequent actions until a preset take-off preparatory time has passed. During the preset take-off preparatory time, the user places the UAV 110 on the first preset position with a certain height. For example, when tapping the UAV 110 to input the take-off preparatory instruction, the user's hand is at a position with lower height (such as ground) and convenient for tapping the UAV 110, and within the preset take-off preparatory time, the user places the UAV on the first preset position with a higher height. The aforementioned example is not intended to limit the embodiment, for example, within the preset take-off preparatory time, no actions are performed to the UAV 110. In this embodiment, a timing program can be used to count the preset take-off preparatory time. For example, the preset take-off preparatory time may be 2 seconds.

In some embodiments, a first timer may be set up. Specifically, upon receiving the take-off preparatory instruction sent from the user, the first timer starts counting a first preset delay time and sends a reminder signal after a specified time to remind the user to perform next actions, for example, the UAV 110 is about to proceed Step S320. The reminder signal may be an audible reminder signal or an optical reminder signal, which is not intended to limit the present embodiment.

As for the optical reminder signal, the processor 240 controls the flashes of an indicator to send the optical reminder signal. Additionally, the indicator would flash faster when it is closer to the end of the first preset delay time. Alternatively, the color of the indicator is changed in response to the waiting time. For example, within a specified length of time after receiving the take-off preparatory instruction, the color of the indicator is changed from the original green to red.

As for a voice prompt signal, the processor 240 could control a buzzer to send the voice prompt signal. Additionally, the sound frequency of the buzzer would become higher when it is closer to the end of the first preset delay time. The specific prompt is not meant to restrict the embodiment and can be set depending on actual needs.

Further, the first timer could be set in many manners. For example, the countdown reminder could be set to start at a specified length of time distant from the end of the first preset delay time. Alternatively, the first timer could start when the take-off preparatory instruction is received.

In step S320, controlling a rotation speed of the at least one rotor with an idle speed rotation in response to the take-off preparatory signal. Specifically, after receiving the take-off preparatory signal sent by the sensor, the processor 240 control the rotors to operate with the idle speed rotation based on the take-off preparatory signal.

The idle speed rotation refers to a state where the rotors carried out at a relatively low speed of rotation. The relatively low speed is safe and can be used to check if the rotors and corresponding control systems are working properly. In addition, before the rotors enter into a rapid rotation, starting with the slower idle speed rotation would give the user a psychological buffer period to adapt to the subsequent rapid rotation. For example, the idle speed rotation can be ranged from 100 to 2000 rev/min, which is not set as a restriction to the embodiment.

In step S330, the rotation speed of the at least one rotor is increased up to a rated speed under predetermined conditions. In some embodiments, the predetermined condition is that a detected vertical velocity of the UAV is greater than or equal to a threshold. Alternatively, the predetermined condition is that a second preset delay time has lapsed since the at least rotor is running with the idle rotation speed. Thus, a second preset delay timer could be set up to count the second preset delay time. In some embodiments, a predetermined vertical velocity threshold is ranged from 0.2 m/s to 1 m/s, for example, 0.3 m/s.

Specifically, when the rotors starts to operate with the idle speed rotation, the velocity of the UAV 110 is detected. The velocity of the UAV 110 can be obtained through combined effects of multiple sensors of the UAV 110. For example, the initial velocity of the UAV 110 is obtained by an accelerometer integration. Since the drift problems is present in the accelerometer, a long integration process will lead to a big deviation to the velocity. Thus, an instantaneous velocity of the UAV 110 can be obtained through GPS, an ultrasonic sensors or a barometer to amend the integration deviation of the accelerometer to get a more accurate velocity of the UAV 110. Specific amendments may be implemented by Kalman filter algorithm. Kalman filter algorithm would make the best estimate of the velocity of the UAV 110 by combining velocity output from the accelerometer, the GPS and the ultrasonic sensors.

In some embodiments, the velocity of the UAV 110 is a velocity downward or upward in the vertical direction. A user can use a hand to move the UAV 110 up or down to create the initial velocity of the UAV 110. Alternatively, the user could withdraw his hand from holding the UAV and let the UAV to fall, in order to create the initial velocity of the UAV 110.

When the velocity is in vertical direction, the instantaneous vertical velocity measured through the GPS, the ultrasonic sensor or the barometer is used to combine with the initial velocity obtained by the integration of the accelerometer to obtain the best estimate of the UAV 110.

In this embodiment, the rated speed refers to a speed that enables the UAV 110 to make stable hovering. In the example of lifting up the UAV 110 with the user's hand, once the rotation speed of the rotors is increased up to a rated speed, the UAV 110 could hover in a position as needed. Alternatively, when performing the UAV 110 take-off through other auxiliary devices, once the rotation speed of the rotors reaches the rated speed, the auxiliary device is removed, the UAV 100 achieves a steady hover.

The acceleration of the rotors are performed in many forms. For example, if the rotors are the square wave modulation driven rotors, the rotation speed of rotors can be exponentially accelerated to a specified speed. If the rotors are FOC ESC driven rotors, the rotors can accelerate in other forms. Specific acceleration mode is not set as limit in the embodiment.

In some embodiments, UAV 110 would record rotor speed for steady hover during each flight, which was stored in a memory, for example, the memory 220 shown in FIG. 2. The memory includes a nonvolatile memory device. No limits are set to specific store timing. The store may be performed every fixed time interval, or it can be stored when landing.

During take-off, the rotation speed for a stable hover in the former flight stored in the non-volatile storage device is set as the rated speed. Since the rotation speed of the UAV 110 steady hover is affected by various factors including altitude, the weight of the UAV 110, propeller parameters, there may be deviations between the rated speed for the current take-off and a stored rated speed for a stable hover flight in the former flight. Thus, UAV 110 reads a rotation speed from the non-volatile memory device and takes it as the rated speed, and a flight control device, for example, the processor 240 of the UAV 110 shown in FIG. 2, will perform adjustments according to attitudes and accelerations in the hover, thereby ultimately achieving a steady hover.

In some embodiments, the method described above may further include steps S430-S460, as shown in FIG. 4. Other steps in FIG. 4 including Steps 410-420 are substantially identical to the Steps 310-320 of FIG. 3, which will not be elaborated here.

In step S430, a vertical velocity of the UAV is detected.

In step S440, it is determined whether the detected vertical velocity of the UAV reaches a threshold.

In step S450, when it is determined that the detected vertical velocity of the UAV 110 is greater than or equal to the threshold, the rotation speed of the at least one rotor is increased up to the rated speed rotation. In the embodiment of FIG. 4, when the user needs the UAV to enter a take-off state, a movement that causes a relative position/velocity change of the UAV will occur to the UAV. For example, when the sensor assembly 270 equipped in the UAV 110 measures the vertical velocity of the UAV 110 that is greater than or equal to the predetermined threshold, the step S450 is performed.

In some embodiments, when the detected vertical velocity of the UAV 110 is greater than or equal to the threshold, a prompt alert indicating of the rotor acceleration will be sent to inform the user that the vertical velocity of the UAV 110 has been greater than or equal to the threshold and the UAV 110 is about to enter the next operation. The prompt alert may be optical or audible.

In some embodiments, an acceleration waiting time can be set up. That is, once the prompt alert is sent, the acceleration waiting time is set up before proceeding to step S450, so that users can adjust the current position of the UAV 110 to get a better take-off position (or photo capturing position).

In step S460, when it is determined that the detected vertical velocity of the UAV is less than the threshold, after a second preset delay time lapses since controlling a rotation speed of the at least one rotor with an idle speed rotation in response to the take-off preparatory signal, the rotation speed of the at least one rotor is increased up to the rated speed rotation.

For example, when the rotors start to operate with the idle rotation speed, the velocity of the UAV 110 is detected. After waiting for the second preset delay time, even though the velocity of the UAV 110 has not reached the threshold, it can proceed to step S460. The second preset delay time can be set according to actual needs and is not meant to limit the embodiment. For example, the preset delay time is 3 seconds. Further, the velocity is referred to as a velocity of the UAV 110 in vertical upward or downward direction.

In addition to the flowcharts shown in FIGS. 3 and 4, the present disclosure also incorporate certain mechanisms/steps for UAV's safety considerations, as described in details below.

In some embodiments, once the rotors start rotating, a real-time rotation speed of the rotors is detected. When detecting that the rotation speed of the rotors is abnormal, the rotation of the rotors is terminated.

For example, during the rotation of the rotors, the rotation speed of the rotor will change abruptly if bumping to other objects. In response, termination of the rotation of the rotors will avoid occurrence of personnel injury or damage to other objects or the rotors. Therefore, the safety of the environment and the UAV 110 are ensured.

In alternative embodiments, the abnormality of the rotation speed of the rotors may be detected by measuring electric current changes of drive motors of the rotors. When the rotation speed of the rotors drops under normal flight control, the electric current of the drive motors of the rotors will decreases. While when the rotors collide with other objects, the rotation speed of the rotors is forced to decrease and the rotation speed of the drive motor is forced to decrease, which will further cause the current to rise. Accordingly, as a safety measure, if the electric current of the drive motor is detected to rise abruptly, the rotors stop rotating.

In some embodiments, when the rotors start rotating, a real-time detection of altitude of the UAV 110 is performed to get a tilting angle of the UAV 110. In addition, when the detected tilting angle is greater than an angle threshold, the rotors are controlled to stop rotating. The angle threshold may be set according to actual demands, such as 90 degrees. When there is an occurrence of a tilt or a flip above the angle threshold to the UAV 110, the rotors are controlled to stop rotating, thus stopping the process of take-off. Specifically, the altitude of the UAV 110 can be measured by an inertial measurement unit (IMU) comprising gyroscopes and accelerometers.

It should be understood that the above steps of stopping rotor may be performed immediately after certain emergency conditions are detected, thus stopping or interrupting the process of UAV's take-off, hover, or other operations.

In addition to the safety considerations, the present disclosure also addresses certain false operations of UAV's user. For example, due to the danger or fear arising from the high speed rotation of the rotors, the user may throw away the UAV 110 because of a shock or other reasons. If UAV 110 is thrown away, a tilt or a flip above the angle threshold occurs, the UAV 110 stops take-off by controlling the rotors to stop operating.

FIG. 5 provides a schematic view of the structure of the control device 210 shown in FIG. 2.

As depicted in FIG. 5, the control device 210 includes a receiver 510 configured to receive a take-off preparatory signal. The take-off preparatory signal is triggered by inputting a take-off preparatory instruction from a user when the UAV 110 is placed to a preset take-off position. For example, the receiver 510 detects if the take-off preparatory signal is input through triggering a button, a voice control or tapping the UAV 110.

The control device further includes a controller 520, which is configured to control a rotation of the at least one rotor with an idle speed rotation in response to the take-off preparatory signal.

Based on predetermined conditions, an increasing module 530 is configured to increase the rotation speed of the at least one rotor up to the rated speed. For example, when the predetermined condition that the detected vertical velocity of the UAV 110 is greater than or equal to the threshold is met, the increasing module 530 is configured to increase the rotation speed of the at least one rotor up to the rated speed.

Alternatively, when the predetermined condition that a second preset delay time has lapsed since the at least rotor is running with the idle rotation speed is met, increasing module 530 is configured to increase the rotation speed of the at least one rotor up to the rated speed.

In some embodiments, the control device may further comprise a first timer 540 and a second timer 550. The first timer 540 is configured to start counting a first preset delay time based on the take-off preparatory signal before rotating the at least rotor with the idle speed rotation. The second timer 540 is configured to start counting a second preset delay time since the at least rotor is running with the idle rotation speed.

Further, since the rotors of the UAV 110 may collide with other objects during flight, other modules may be incorporated to prevent further personal injury or damages. In some embodiments, the control device 210 also includes a monitoring module 560 for monitoring at least one parameter of the UAV 110, for example, a rotation speed of the rotor.

In the presence of abnormality of the at least one parameter, a protection mechanism needs to set up, for example, a terminating module 570 is incorporated into the control device 210 and configured to terminate the rotation of the rotor when the monitoring module 560 monitors an abnormality, for example, the rotation speed of the rotor abruptly changes.

In addition, during take-off, the UAV 110 may be thrown away due to the user's false operation. In such case, a tilting angle of the UAV 110 may be greater or the UAV 110 may flip over, the altitude of the UAV 110 is difficult to control. In response, the aforementioned at least one parameter may comprises an altitude of the UAV 110, and the monitoring module 560 is configured to monitor the attitude of the UAV 110 to obtain a tilting angle. In the occurrence of abnormality of the tilting angle, for example, the monitored tilting angle is greater than an angle threshold, the terminating module 570 is also configured to terminate the rotation of the rotor.

In summary, the embodiments of the present disclosure provide a control method for controlling an UAV, a control apparatus and a take-off system. The UAV is placed in a certain position with a preset take-off height. Once the UAV receives a take-off preparatory instruction, the UAV starts to rotate in an idle speed rotation. During the idle speed rotation, the UAV detects and controls its vertical velocity, so the UAV controls rotors to increase to the rated rotation speed to hover in a position, or after a preset delay time the rotors increase to the rated rotation speed to hover in a position, so that the UAV can take off from the preset position.

The apparatus and methods disclosed in the embodiments of the present disclosure can be implemented by other ways. The aforementioned apparatus embodiments are merely illustrative. For example, flowcharts and block diagrams in the figures show the architecture and the function operation according to a plurality of apparatus, methods and computer program products disclosed in embodiments of the present disclosure. In this regard, each frame of the flowcharts or the block diagrams may represent a module, a program segment, or portion of the program code. The module, the program segment, or the portion of the program code include one or more executable instructions for implementing predetermined logical function. It should also be noted that in some alternative embodiments, the function described in the block can also occur in a different order as described from the figures. For example, two consecutive blocks may actually be executed substantially concurrently. Sometimes they may also be performed in reverse order, depending on the functionality. It should also be noted that, each block of the block diagrams and/or flowchart block and block combinations of the block diagrams and/or flow chart can be implemented by a dedicated hardware-based systems execute the predetermined function or operation or by a combination of a dedicated hardware and computer instructions.

Further, the functional modules disclosed in embodiments of the present disclosure may be integrated together to form a separate part. Alternatively, each module can be alone, or two or more modules can be integrated to form a separate section.

If the functions are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include: U disk, removable hard disk, read only memory (ROM), a random access memory (RAM), floppy disk or CD-ROM, which can store a variety of program codes. It should be noted that relational terms, such as first and second, are used solely to a separate operating entity from another entity, and do not necessarily require or imply that the actual such relationship or order exist between these entities or operations. Moreover, the term "comprising", "including" or any other variation thereof are intended to cover a non-exclusive inclusion, such that processes, methods, articles, or apparatus including a series of factors includes not only those elements, but also includes other elements not explicitly listed, or further includes inherent factors for such processes, methods, articles or devices. Without more constraints, elements defined by the statement "includes a . . . " does not exclude the presence of other elements included in the processes, methods, articles or devices.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A method for controlling an unmanned aerial vehicle (UAV), the UAV comprising at least one rotor, the method comprising steps of:
   receiving a take-off preparatory signal;
   awaiting a first preset delay time upon the take-off preparatory signal being received;
   controlling a rotation speed of the at least one rotor with an idle speed rotation after the first preset delay time lapses in response to the take-off preparatory signal; and
   increasing the rotation speed of the at least one rotor up to a rated speed rotation under predetermined conditions.

2. The method of claim 1, wherein the step of awaiting further comprises: starting counting the first preset delay time and sending a reminder to a user.

3. The method of claim 1, wherein prior to the step of receiving, it further comprises: placing, by a user, the UAV in a first preset position, wherein the first preset position is a position for a take-off preparation of the UAV.

4. The method of claim 1, wherein the step of awaiting further comprises: placing, by a user, the UAV in a second preset position within the first preset delay time, and the second preset position is a position for capturing an image.

5. The method of claim 1, wherein the predetermined condition is a detected vertical velocity of the UAV being greater than or equal to a threshold.

6. The method of claim 5, wherein the detected vertical velocity of UAV is caused by the following: lifting the UAV upward or downward by a hand of a user, or withdrawing by a hand of a user from holding the UAV.

7. The method of claim 1, wherein the predetermined condition is that a second preset delay time has lapsed since controlling a rotation speed of the at least one rotor with an idle speed rotation in response to the take-off preparatory signal.

8. The method of claim 1, further comprising the steps of:
   monitoring at least one parameter of the UAV;
   terminating a rotation of the at least one rotor in response to monitoring that the at least one parameter of the UAV is abnormal.

9. The method of claim 8, wherein the at least one parameter comprises the rotation speed of the at least one rotor; and wherein the step of terminating comprises: terminating the rotation of the at least one rotor in response to monitoring that the rotation speed of the at least one rotor is abruptly changed.

10. The method of claim 8, wherein the at least one parameter comprises a tilting angle of the UAV; and wherein the step of terminating comprises: terminating the rotation of the at least one rotor in response to monitoring that the titling angle of the UAV is greater than an angle threshold.

11. The method of claim 8, wherein the at least one parameter comprises an electric current of a drive motor of the at least one rotor; and wherein the step of terminating comprises: terminating the rotation of the at least one rotor in response to monitoring that the electrical current of the drive motor of the at least one rotor increases abruptly.

12. An apparatus for controlling an UAV, the UAV comprising at least one rotor, the apparatus comprising:
a receiver configured to receive a take-off preparatory signal;
a controller configured to control a rotation speed of the at least one rotor with an idle speed rotation based on the take-off preparatory signal to check the at least one rotor or a control system during the idle speed rotation;
an accelerator configured to increase the rotation speed of the at least one rotor up to a rated speed rotation under predetermined conditions, wherein the rotation speed of the rated speed rotation enables the UAV to make stable hovering.

13. The apparatus of claim 12, wherein the apparatus further comprises:
a first timer configured to start counting a first preset delay time since the take-off preparatory signal is received, wherein said first preset delay time lapses before rotating the at least rotor with the idle speed rotation.

14. The apparatus of claim 12, wherein the apparatus further comprises:
a second timer configured to start counting a second preset delay time since controlling a rotation speed of the at least one rotor with an idle speed rotation in response to the take-off preparatory signal.

15. The apparatus of claim 12, wherein the predetermined condition is a detected vertical velocity of the UAV being greater than or equal to a threshold.

16. The apparatus of claim 12, wherein the predetermined condition is a second preset delay time has lapsed since controlling a rotation speed of the at least one rotor with an idle speed rotation in response to the take-off preparatory signal.

17. The apparatus of claim 12, further comprising:
a monitor configured to monitor at least one parameter of the UAV; and
a terminator configured to terminate a rotation of the at least one rotor based on the at least one parameter of the UAV being abnormal.

18. The apparatus of claim 17, wherein the at least one parameter comprises a rotation speed of the at least one rotor; and wherein the terminator is configured to terminate the rotation of the at least one rotor based on the monitored rotation speed of the at least one rotor being abruptly changed.

19. The apparatus of claim 17, wherein the at least one parameter comprises a tilting angle of the UAV and wherein the terminator is configured to terminate the rotation of the at least one rotor based on the titling angle of the UAV being greater than an angle threshold.

20. The apparatus of claim 17, wherein the at least one parameter comprises an electric current of a drive motor of the at least one rotor; and wherein the terminator is configured to terminate the rotation of the at least one rotor in response to monitoring that the electrical current of the drive motor of the at least one rotor increases abruptly.

21. A take-off system, comprising:
an UAV;
a take-off deck configured to permit the UAV to take off; and
wherein the UAV configured to adjust its vertical velocity such that the UAV can hover in a predetermined position upon the removal of the take-off deck.

22. The system of claim 21, wherein the take-off deck comprises a human hand.

23. The method of claim 1, wherein the take-off preparatory signal is inputted by pressing a button of the UAV, voice control or tapping the UAV.

24. The method of claim 1, further comprising checking the at least one rotor or a control system during the idle speed rotation.

* * * * *